United States Patent
Saburi et al.

(10) Patent No.: US 7,382,395 B1
(45) Date of Patent: Jun. 3, 2008

(54) VIDEOPHONE SYSTEM USING CELLULAR TELEPHONE TERMINAL

(75) Inventors: Kazumi Saburi, Yokohama (JP); Hitoshi Inoue, Yokohama (JP); Yoshiyuki Shibata, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/743,241

(22) PCT Filed: May 6, 1999

(86) PCT No.: PCT/JP99/02351

§ 371 (c)(1),
(2), (4) Date: Jan. 5, 2001

(87) PCT Pub. No.: WO00/69158

PCT Pub. Date: Nov. 16, 2000

(51) Int. Cl.
*H04N 7/14* (2006.01)

(52) U.S. Cl. .............................. 348/14.01; 348/14.02; 348/14.03

(58) Field of Classification Search .. 348/14.01–14.03, 348/14.05–14.09, 14.1, 14.9; 379/428.01–428.04, 379/433.01, 433.04–433.05; 455/550, 556–557, 455/566, 90, 550.1, 90.1–90.3; 370/260; 345/753; 709/204; 715/753
See application file for complete search history.

(56) References Cited

U.S. PATENT DOCUMENTS

| | | | | |
|---|---|---|---|---|
| 4,928,300 A | * | 5/1990 | Ogawa et al. | 348/14.01 |
| 5,510,829 A | | 4/1996 | Sugiyama et al. | 348/14.01 |
| 5,793,416 A | * | 8/1998 | Rostoker et al. | 348/14.13 |
| 5,838,577 A | * | 11/1998 | Tokano | 702/60 |
| 5,896,165 A | * | 4/1999 | Rao | 348/14.06 |
| 6,310,944 B1 | * | 10/2001 | Brisebois et al. | 379/142.01 |
| 6,377,818 B2 | * | 4/2002 | Irube et al. | 455/556 |
| 6,452,626 B1 | * | 9/2002 | Adair et al. | 348/158 |
| 6,469,731 B1 | * | 10/2002 | Saburi | 348/14.02 |

FOREIGN PATENT DOCUMENTS

| | | | |
|---|---|---|---|
| EP | 1 033 876 | | 9/2000 |
| JP | 1-311744 | | 12/1989 |
| JP | 01311744 A | * | 12/1989 |
| JP | 401311744 A | * | 12/1989 |
| JP | 3-109890 | | 5/1991 |
| JP | 3-265349 | | 11/1991 |
| JP | 04010746 A | * | 1/1992 |
| JP | 4-165853 | | 6/1992 |
| JP | 04165853 A | * | 6/1992 |
| JP | 5-145655 | | 6/1993 |
| JP | 05145655 A | * | 6/1993 |
| JP | 6-253300 | | 9/1994 |
| JP | 6-276420 | | 9/1994 |
| JP | 406296277 A | * | 10/1994 |

(Continued)

*Primary Examiner*—Melur Ramakrishnaiah
(74) *Attorney, Agent, or Firm*—Hogan & Hartson LLP

(57) ABSTRACT

When a call-up is generated, an data type identifying unit of a CPU identifies the type of data type information which is appended as a header to received data as one of sound data, text data, and image and sound data, and displays the type on a display unit comprising a monitor. When the type is sound data or text data, an application for executing a corresponding telephone function or data communication function is activated via the user line connection. When the type is image and sound data, an application for executing a corresponding visual telephone function is activated after line connection.

10 Claims, 8 Drawing Sheets

| | FOREIGN PATENT DOCUMENTS | | | JP | 10-308981 | 11/1998 |
|---|---|---|---|---|---|---|
| | | | | JP | 11-146368 | 5/1999 |
| JP | 408265450 A | * | 10/1996 | WO | WO 9726744 A2 * | 7/1997 |
| JP | 10-013561 | | 1/1998 | | | |
| JP | 10-164273 | | 6/1998 | * cited by examiner | | |

VIDEOPHONE SYSTEM USING CELLULAR TELEPHONE TERMINAL

BACKGROUND OF THE INVENTION

1. Field of the Invention

The present invention relates to a mobile communication terminal, which has a telephone function, a data communication function, and a visual telephone function. The present invention also relates to a visual telephone system using the mobile communication terminal.

2. Description of the Related Art

Good operability is required in realizing a visual telephone system comprising a visual telephone function appended to a mobile communication terminal having a telephone function and a data communication function using a communication unit which is capable of high-speed data transmission, such as PDC (Personal Digital Cellular), CDMA (Code Division Multiple Access), GSM (Global System for Mobile Communication) and PHS (Personal Handy-phone System), in addition to WCDMA (Wide band CDMA), CDMA 2000, and the like, which are being developed as next-generation technology.

The reason for this is that, for example, when a telephone call has been received, the person receiving the call moves his ear and mouth near to the mobile communication terminal and speaks. In the case of a visual telephone call, he speaks while watching the face of the caller which is displayed on a display at a fixed distance from his own ear and mouth.

However, when a visual telephone function has been appended to the mobile communication terminal as mentioned above, it is not possible to know which type of call has been received. This makes it difficult to smoothly receive telephone calls and visual telephone calls.

In order to receive calls smoothly, the user needs to know in advance which type of call is being received. After confirming the type of the received call, the user must activate functions for that mode.

SUMMARY OF THE INVENTION

The mobile communication terminal of the present invention has a telephone function, a data communication function, and a visual telephone function. This terminal comprises a camera including an image sensor which picks up images; a display unit which displays images; a data type identifying unit which identifies whether received data is sound data, text data, or image and sound data, based on a data type information which was appended in advance as a header to received data; a registering unit which stores a plurality of application programs including at least an application program for executing the visual telephone function; and a control unit which select one of the application programs in correspondence with the data type information identified by the data type identifying unit and activates the selected application program.

The mobile communication terminal according to the second aspect of the present invention comprises a body; a detachable imaging unit having an image sensor which is detachable to the body; a visual telephone controller which enables the visual telephone function when the detachable imaging unit is attached to the body; a display unit which displays images; a data type identifying unit which identifies whether received data is sound data, text data, or image and sound data, based on a data type information which was appended in advance as a header to received data; a registering unit which stores a plurality of application programs including at least an application program for executing the visual telephone function; and a control unit which select one of the application programs in correspondence with the data type information identified by the data type identifying unit and activates the selected application program.

The visual telephone system of the present invention comprises the above mobile communication terminal, and a base station which sends to the mobile communication terminal data including data type information as a header.

That is, this system comprises an data type identifying unit which identifies whether the received data is sound data, text data, or image and sound data, based on data type information which was appended in advance as a header to the received data; a registering unit which stores a plurality of application programs comprising application programs for executing at least the visual telephone function; and a control unit which activates an application program in correspondence with data type information, identified by the data type identifying unit.

According to the mobile communication terminal and the visual telephone system using the mobile communication terminal, when a communication is received, the control unit activates an application which corresponds to data type information, appended as the header of the received data. Therefore, there is no need for controls such as activating a mode in accordance with the type. Consequently, the visual telephone system for visual communication can be controlled smoothly, and the amount of control which must be executed by the user can be greatly reduced.

The second aspect of the mobile communication terminal comprises a body and a detachable imaging unit (adaptor) which can be attached to the body, and a visual telephone function is appended by attaching the detachable imaging unit having an image sensor to the body. The body comprises a display unit for displaying images, and has a telephone function and a data communication function. This system comprises an data type identifying unit which identifies whether received data is sound data, text data, or image and sound data, based on data type information which was appended in advance as a header to the received data; a registering unit which stores a plurality of application programs comprising application programs for executing at least the visual telephone function; and a control unit which activates an application program in correspondence with data type information, identified by the data type identifying unit.

According to the second aspect of the visual telephone system using a mobile communication terminal, when a communication is received after the visual telephone function has been appended by attaching the detachable imaging unit to the mobile communication terminal, the control unit activates an application which corresponds to data type information, appended as the header of the in-coming information. Therefore, there is no need for controls such as activating a mode in accordance with the type of data. Consequently, the visual telephone system for visual communication can be controlled smoothly, and the amount of control which must be executed by the user can be greatly reduced.

Furthermore, the detachable imaging unit is attached to the body of the mobile communication terminal having a telephone function and a data communication function and comprising a displaying unit which displays images. The detachable imaging unit comprises an image sensor which appends a visual telephone function to the mobile communication terminal.

According to the detachable imaging unit of the present invention, a visual telephone function can be appended extremely easily to a mobile communication terminal, such as a personal computer comprising a communication unit, by attaching the detachable imaging unit to the communication terminal thereof. Therefore, the detachable imaging

DESCRIPTION OF THE PREFERRED EMBODIMENTS

Preferred embodiments of the visual telephone system of the present invention will be explained with reference to the drawings.

Figure 1:
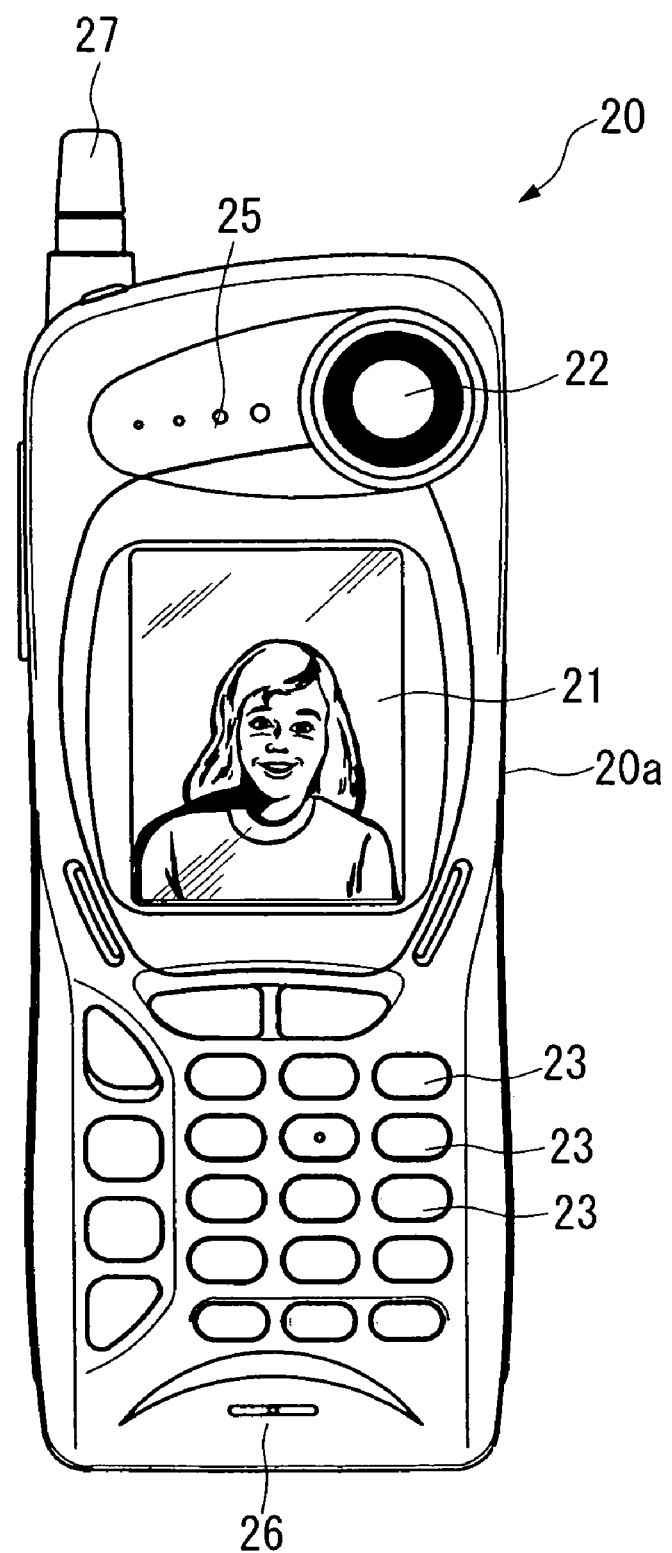
FIG. 1 is an external front view of a mobile communication terminal having a visual telephone function for illustrating the visual telephone system using a mobile communication terminal according to the present invention.
Figure 2:
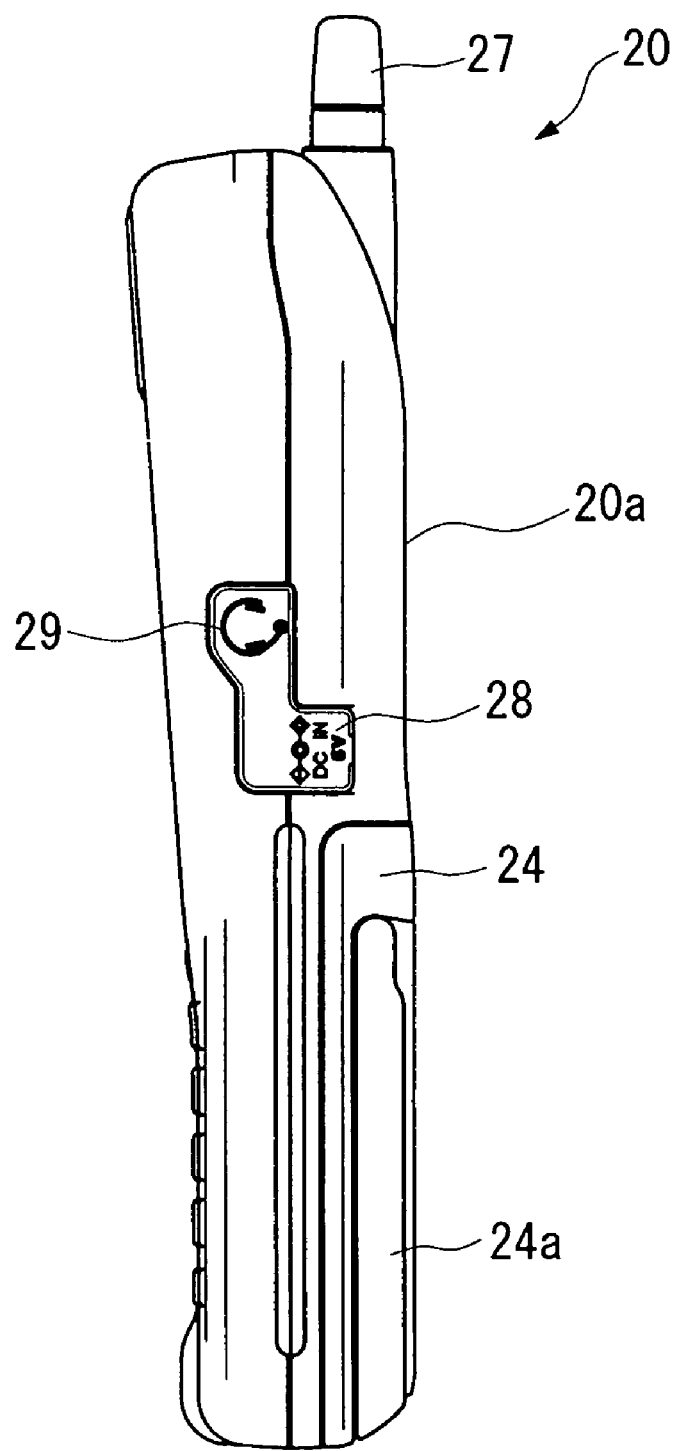
FIG. 2 is an external side view of a mobile communication terminal having a visual telephone function for illustrating the visual telephone system using a mobile communication terminal according to the present invention.
Figure 3:
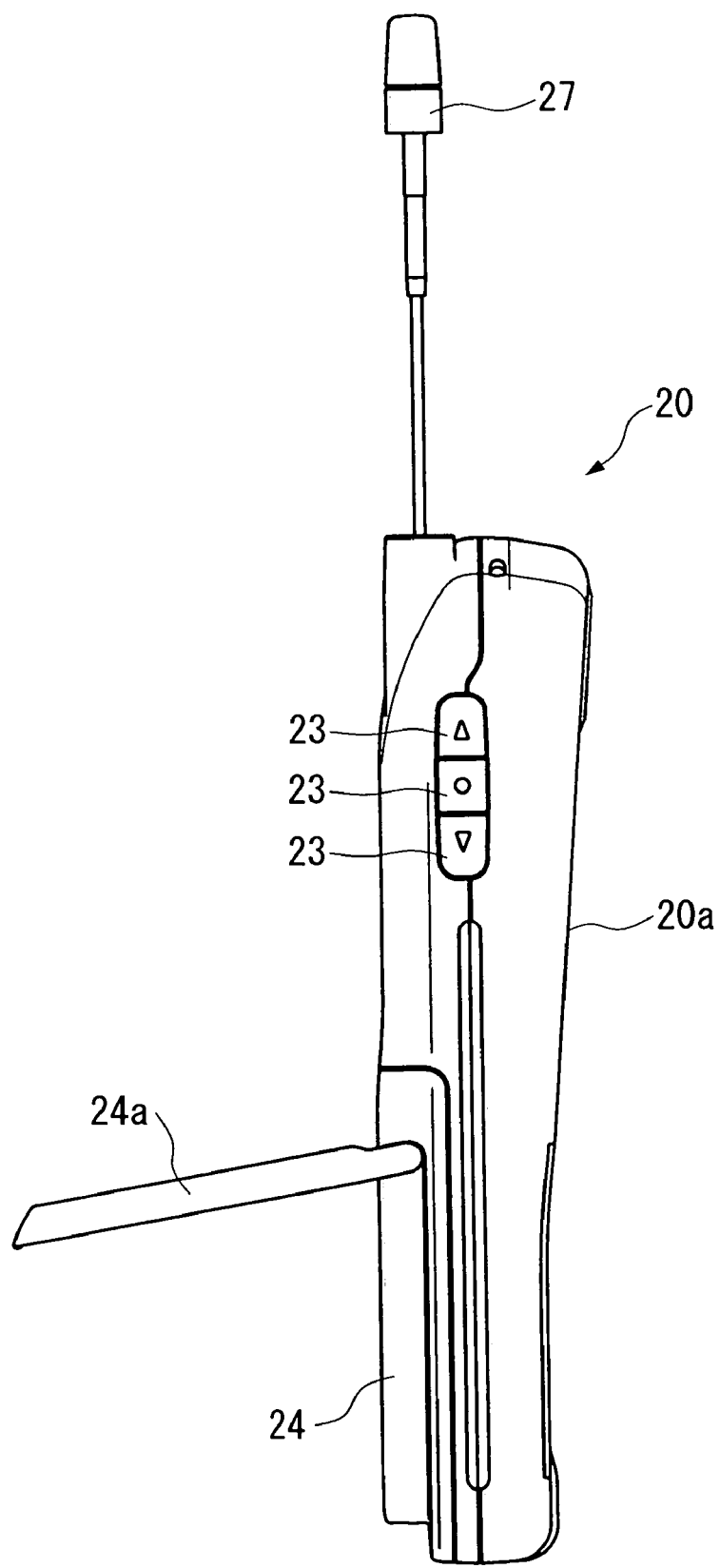
FIG. 3 is an external side view of a mobile communication terminal having a visual telephone function for illustrating the visual telephone system using a mobile communication terminal according to the present invention.

FIG. 1 is a front view showing the outside of a mobile communication terminal having a visual telephone function according to the present invention, and FIGS. 2 and 3 are side views showing the outside of the mobile communication terminal having a visual telephone function.

As shown in FIGS. 1 to 3, a monitor 21 comprises a colour liquid crystal plate, and is provided in front of a terminal main body 20a of the mobile communication terminal 20. Image information and/or communication function information in the mobile telephone apparatus, such as telephone numbers, electric field pictures and the like, are/is displayed on the monitor 21. The monitor 21 constitutes a display unit of the present embodiment.

A camera 22 comprises an image sensor (explained later) and is provided above the terminal main body 20a on the front side, and this camera 22 captures images. A plurality of control key 23 are provided below the monitor 21. Various types of control can be executed by pushing the keys 23. Some of the control key 23 are provided on one side of the terminal main body 20a.

A speaker 25 is provided next to the camera 22 at the top of the terminal main body 20a, and functions as a sound output unit. A microphone 26 is provided at the bottom of the terminal main body 20a. Sound is input to the microphone 26, and the sound of the other party's voice, sound notifying an in-coming call, alarms, and the like, are output from the speaker 25. An extendable antenna 27 is provided on top of the terminal main body 20a. A built-in RF section 48 (explained later) transmits and receives image data and sound data via the antenna 27.

An outside power connecting section 28 is provided on the other side of the terminal main body 20a, and connects via an adaptor to an AC power source such as a wall socket. An outside sound output section 29 is similarly provided on the other side of the terminal main body 20a, and is connected to an ear-phone or the like.

A battery lid 24 is provided in the rear side of the terminal main body 20a, and can be removed and attached to a storing section in which a battery is accommodated. A stand 24a is joined to the battery lid 24 and can be turned within a predetermined angle. By turning the stand 24a so as to increase the angle, the mobile communication terminal 20 can be supported in a sloping position on an installation surface.

Subsequently, the functions of the mobile communication terminal 20 having the visual telephone function described above will be explained based on the block diagram of FIG. 4.

Figure 4:
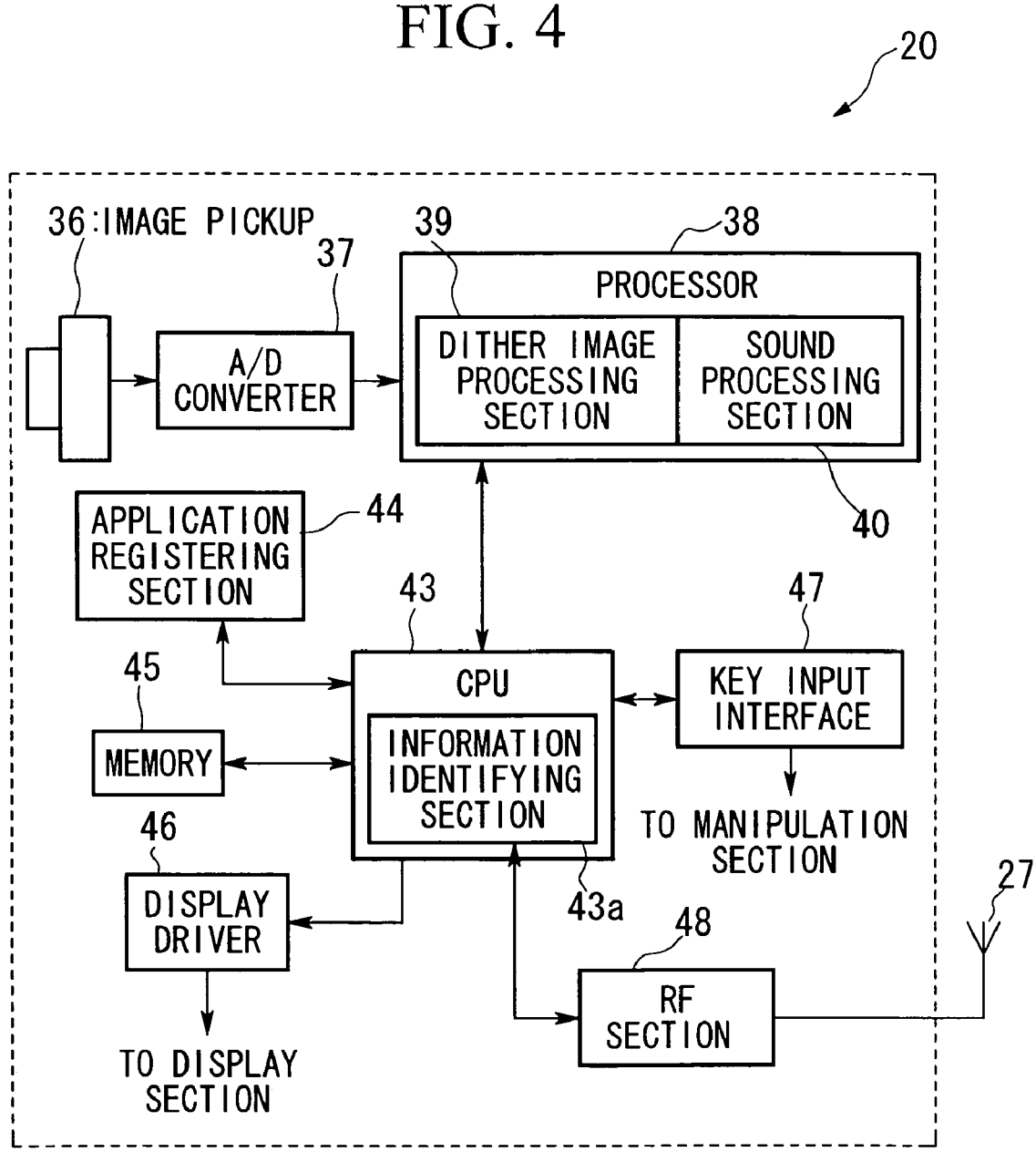
FIG. 4 is a block diagram showing functions of the visual telephone system using a mobile communication terminal according to the present invention.

As shown in FIG. 4, a simple-format information terminal 20 comprises an image sensor 36 included in the camera 22 which converts an image formation object into an electrical signal (pixel signal), an A/D converter 37 which converts the output of the image sensor 36 to digital signals, a processor 38 comprising a dither image processing section 39 which converts the output from the A/D converter 37 to dither image data and a sound processing section 40, a CPU 43 which forms a control unit for controlling the telephone function using a communication unit such as a PHS and data communication functions, an application registering section 44 which forms a registering unit for storing a first application program for executing the telephone function, a second application program for executing the data communication function, and a third application program for executing a visual telephone function, a memory 45 which stores call information data, such as text transmitted and received by data communication, and image data, a display driver 46 which drives a display section comprising the monitor 21 for displaying images and the like, a key input interface 47 which connects control section comprising the control key 23 for telephone and data communication, capturing, reproducing and transferring images, to the CPU 43, and an RF section 48 which the antenna 27 is connected to for telephone and data communication with the terminal of another party by using a PHS line.

The CPU 43 includes an information identifying section 43a comprising an data type identifying unit which identifies types of data based on the data type information appended as headers to the received data.

Figure 5:
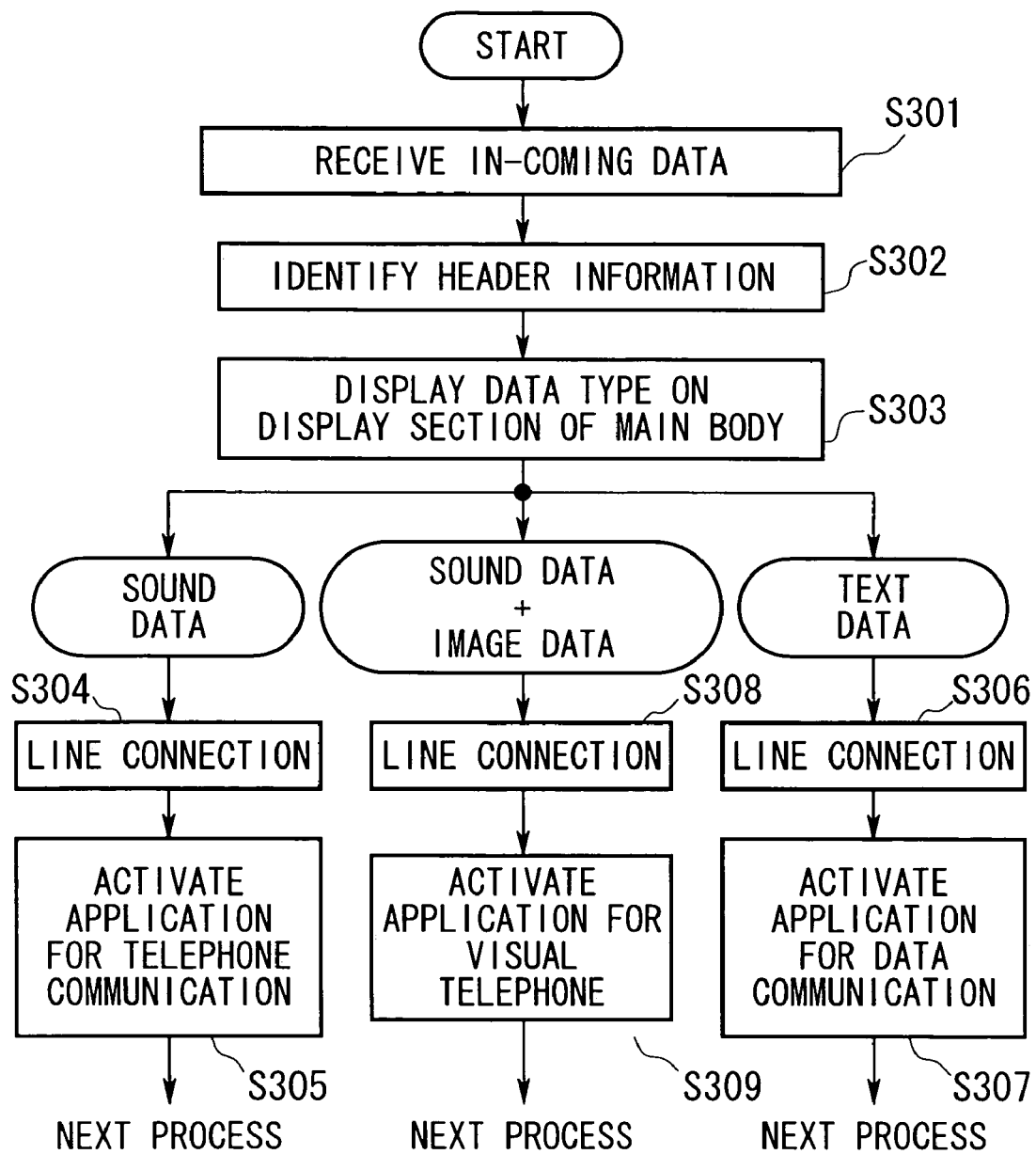
FIG. 5 is a flowchart showing operations and controls in the visual telephone system using a mobile communication terminal of the present invention when a call is received.

Subsequently, the operations and controls of the mobile communication terminal which a telephone function is appended to, as described in the above constitution, will be explained based on the flowchart shown in FIG. 5.

The mobile communication terminal 20 receives data via the antenna 27 and the RF section 48 (step (hereinafter termed "S") 301).

When the CPU 43 determines that the received information is a call-up to itself, the CPU 43 carries out call-up and uses its information identifying section 43a to identify the type of data which is appended as a header to the received data (S302).

The CPU 43 controls the display driver 46 so as to display the type of the in-coming telephone communication, data communication or visual telephone communication on the display section comprising the monitor 21 (S303).

Since the user can learn the type of in-coming communication from the display, he can handle the communication appropriately when he answers.

The user answers by pressing a communication key among the control key 23 (S3024, S308, or S309). In the case of sound data, the CPU 43 activates an application for telephone communication from the application registering section 44 (S305). In the case of text data, the CPU 43 activates an application for data communication (S307). Consequently, telephone conversation and data reception can be smoothly controlled.

In the case of image and sound data, the CPU 43 activates an application for visual telephone from the application registering section 44 (S309).

After an application appropriate to the information type has been activated in this way, the user can control the communication smoothly.

According to the visual telephone system using the mobile communication terminal 20, when a call is received, the CPU 43 activates an application which is suitable to the type of data based on the data type information appended as a header to the received data. Therefore, it is not necessary to activate functions of a mode or the like in correspondence with the information type. Consequently, the visual telephone system for visual communication can be smoothly controlled, and the amount of control executed by the user can be greatly reduced.

The above embodiment described an example in which the display can be viewed on the monitor 21 of the mobile communication terminal 20, but the type display can be identified audibly. For example, the audio features and patterns of the sound notifying that there is an in-coming call can be set to correspond separately to data communication and visual telephone.

In the embodiment described above, the mobile communication terminal 20 which a visual telephone function is appended to comprises a monitor 21 and a camera 22, provided together in a single body. Alternatively, a unit for appending the visual telephone function may be separately provided to the mobile communication terminal.

One example of this type of mobile communication terminal will be explained.

Figure 6A:
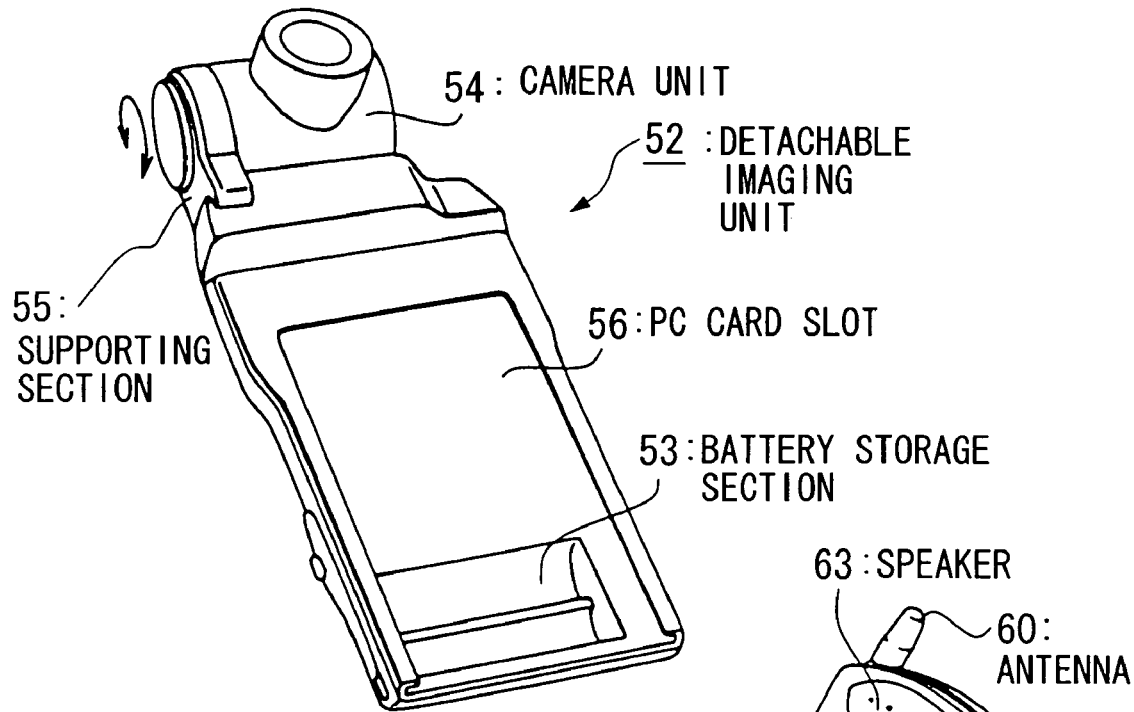
FIGS. 6A and 6B are external perspective views of a simple-format information terminal for illustrating another visual telephone system using a mobile communication terminal according to the present invention, FIG. 6A being an external perspective view of a detachable imaging unit, and FIG. 6B, an external perspective view of a mobile communication terminal in which the detachable imaging unit has been provided in a single body.
Figure 6B:
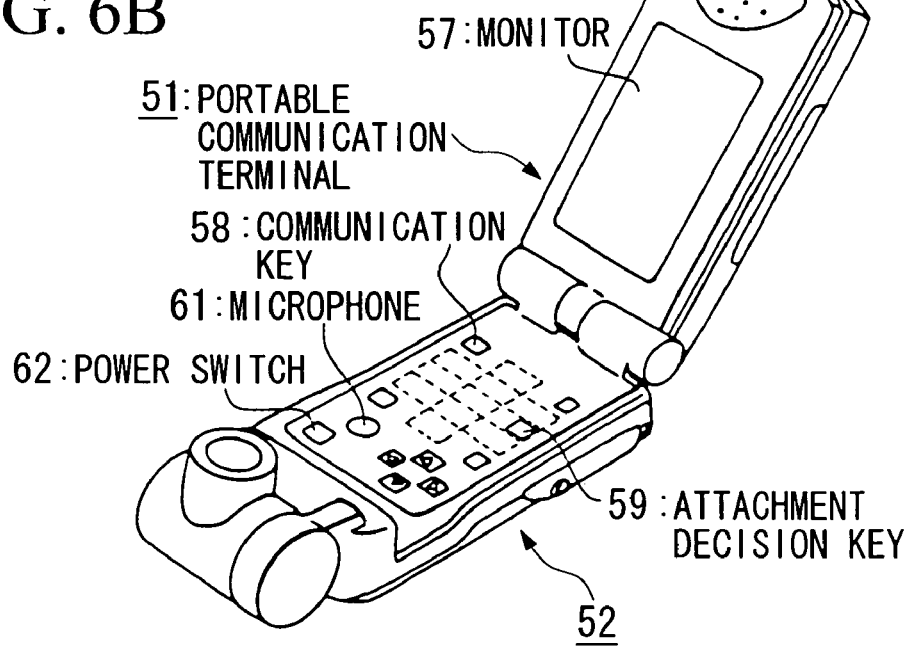

FIGS. 6A and 6B are diagrams showing the outside of a mobile communication terminal 20. FIG. 6A is an external perspective view of a detachable imaging unit, and FIG. 6B is an external perspective view of a visual telephone system in which the detachable imaging unit has been provided in a single body with the mobile communication terminal.

As shown in FIGS. 6A and 6B, the detachable imaging unit 52 is attached to the mobile communication terminal 51, and comprises a camera unit 54 for capturing an image of the object. The camera unit 54 is provided above a PC card slot 56, and can be rotated around a supporting section 55 so as to change its capturing direction in the direction of the arrow. An electronic circuit is provided in the PC card slot 56 portion, and a battery storage section 53 is provided therebelow.

The mobile communication terminal 51 has a data communication function and a telephone function using a communication unit, such as a PHS, and as above comprises a top flip comprising a monitor 57 as a display section, a speaker 63, an antenna 60, and the like; and a bottom flip comprising a control section which comprises control key including having ten-key, selection key, and function keys such as a communication key 58 and an attachment decision key 59 for determining whether the user has decided to attach. The top and bottom flips can be folded together.

The visual telephone system is realized by attaching the PC card slot 56 of the detachable imaging unit 52 to a slot connection terminal, provided at the lower end of the bottom flip of the mobile communication terminal 51.

Figure 7:
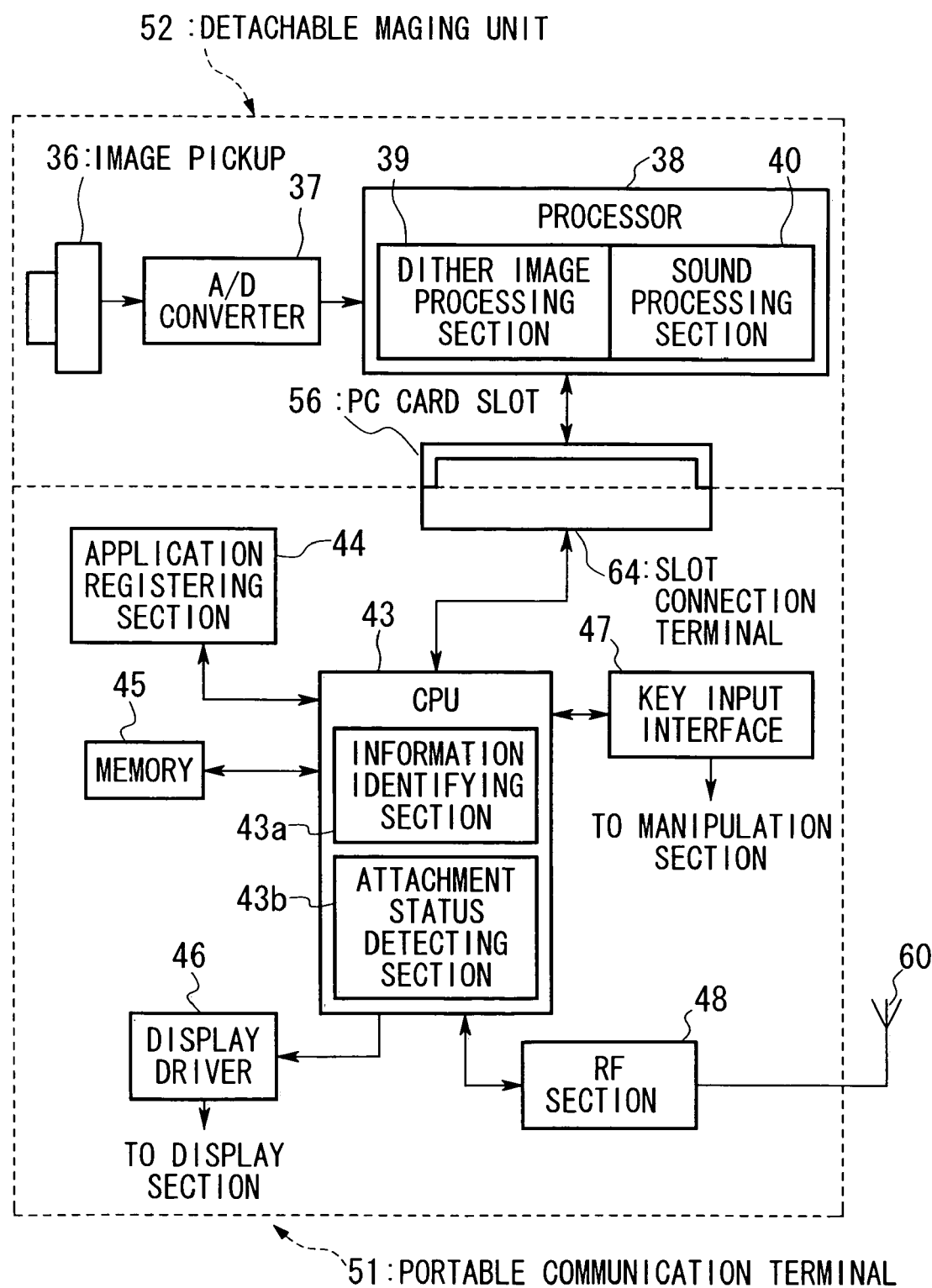
FIG. 7 is a block diagram showing functions of another visual telephone system using a mobile communication terminal according to the present invention.

As shown in FIG. 7, in the visual telephone system which comprises the detachable imaging unit 52 attached to the mobile communication terminal 51 in the manner described above, the PC card slot 56 is provided on the detachable imaging unit 52 side and a slot connection terminal 64 is provided on the mobile communication terminal 51 side.

By attaching the PC card slot 56 of the detachable imaging unit 52 to the bottom flip of the mobile communication terminal 51, the PC card slot 56 of the detachable imaging unit 52 becomes connected to the slot connection terminal 64 of the mobile communication terminal 51, enabling signals to be exchanged between the processor 38 of the detachable imaging unit 52 and the CPU 43 of the mobile communication terminal 51.

The CPU 43 of the mobile communication terminal 51 further comprises an attachment status detector, comprising an attachment status detecting section 43b, which detects whether or not the detachable imaging unit 52 is attached.

Figure 8:
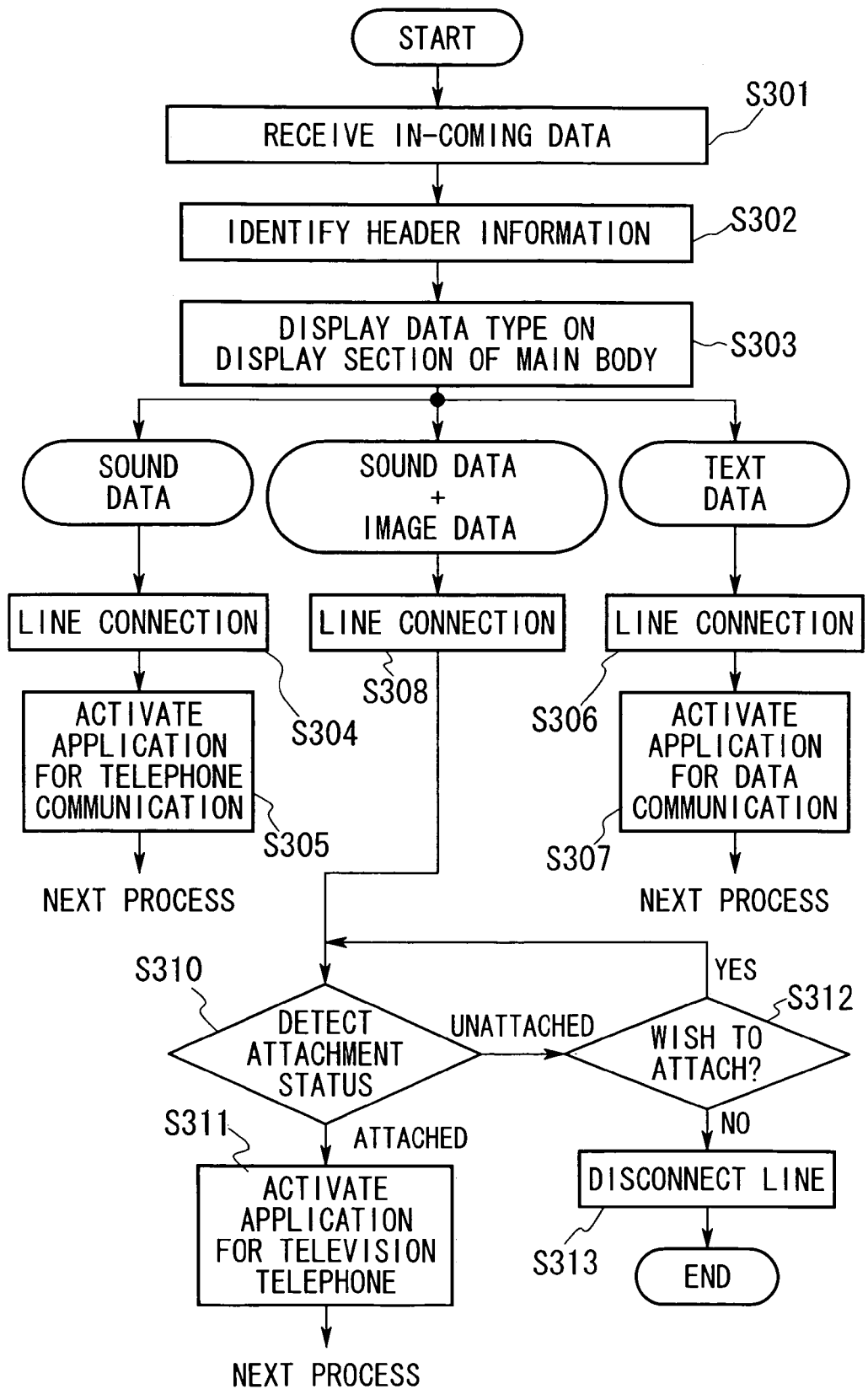
FIG. 8 is a flowchart showing operations and controls in the other visual telephone system using a mobile communication terminal of the present invention when a call is received.

As shown in FIG. 8, in this type of visual telephone system, when the data type information comprises image and sound data, the processes executed from S308 onwards are different from those in the case of the single-body mobile communication terminal 20 described earlier.

When the data type information comprises image and sound data, the CPU 43 uses the attachment status detecting section 43b to determine whether the detachable imaging unit 52 is attached (S310).

When it is determined that the detachable imaging unit 52 is attached from the start, an application for visual telephone is activated from the application registering section 44 (S311).

On the other hand, when the detachable imaging unit 52 is not attached, a message suggesting attachment is visually or audibly informed and it is determined whether the user has decided to attach (S312).

When the user decides not to attach and manipulates the attachment decision key accordingly, the line is disconnected (S313). When the user has decided to attach, the CPU 43 grants a delay and waits for a predetermined period of time. In addition, the CPU 43 transmits information, stating that the detachable imaging unit 52 is being attached, to the terminal of the other party.

The attachment status detecting section 43b once again determines whether the detachable imaging unit 52 has been attached (S310). The line is disconnected when the predetermined delay time has elapsed.

In the case where the user has not manipulated the attachment decision key 59 at all, the line is disconnected after the predetermined period of time has elapsed.

When the detachable imaging unit 52 has been attached, the application for visual telephone is activated from the application registering section 44 in the same way as when the detachable imaging unit 52 was attached from the start (S311).

According to the visual telephone system using the mobile communication terminal 51, when a call is received after the visual telephone function has been appended by attaching the detachable imaging unit 52, the CPU 43 activates an application which corresponds to data type information, appended as the header of the received data. Therefore, there is no need for controls such as activating a mode in accordance with the type. Consequently, controls in the visual telephone system using visual communication can be executed smoothly, and the amount of control which must be executed by the user can be greatly reduced.

The visual telephone function can be appended to the mobile communication terminal 51 extremely easily by attaching the detachable imaging unit 52 to the mobile communication terminal 51. This detachable imaging unit therefore has excellent general versatility, and can be used easily in various types of mobile communication terminal. The detachable imaging unit can be attached extremely easily to communication terminals such as a personal computer comprising a communication unit, thereby appending the visual telephone function thereto.

The above example described a PHS communication unit. However, the communication unit is not limited to PHS, and can be applied to a great variety of communication units such as PDC, CDMA, GSM, WCDMA, and CDMA2000.

As described above, according to the visual telephone system using the mobile communication terminal of the present invention, when a call is received, a controller activates an application which corresponds to data type information, appended as the header of the received data. Therefore, there is no need for controls such as activating a mode in accordance with the type. Consequently, controls in the visual telephone system using visual communication can be executed smoothly, and the amount of control which must be executed by the user can be greatly reduced.

The invention claimed is:

1. A mobile communication terminal having a telephone function, a data communication function, and a visual telephone function, comprising:
   a camera including an image sensor which picks up images;
   a data type identifying unit which identifies whether in-coming information, that is received from the outside of the mobile communication terminal when a call is received, is sound data, text data, or image and sound data, based on a data type information which was appended in advance as a header to in-coming information;
   a registering unit which stores a plurality of application programs including at least an application program for executing the visual telephone function;
   a display unit which displays images;
   a sound output unit which audibly outputs sound; and
   a control unit which activates an application program, displays contents, and outputs contents in correspondence with the data type information, which is appended to in-coming information.

2. A mobile communication terminal according to claim 1, wherein the plurality of application programs further includes an application program for executing a telephone function and an application program for executing a data communication function.

3. A visual telephone system comprising:
   the mobile communication terminal according to claim 1; and
   a base station which sends to the mobile communication terminal data including data type information as a header.

4. A mobile communication terminal according claim 1, further comprising a key which controls the control unit, and wherein, when the key is pressed, the control unit activates an application program in correspondence with the data type information which is appended to in-coming information.

5. A mobile communication terminal having a telephone function, a data communication function, and a visual telephone function, comprising:
   a body;
   a detachable imaging unit having an image sensor which is detachable to the body;
   a visual telephone controller which enables the visual telephone function when the detachable imaging unit is attached to the body;
   a data type identifying unit which identifies whether in-coming information is sound data, text data, or image and sound data, based on a data type information which was appended in advance as a header to in-coming information;
   a registering unit which stores a plurality of application programs including at least an application program for executing the visual telephone function; and
   a display unit which displays images;
   a sound output unit which audibly outputs sound; and
   a control unit which activates an application program, displays contents, and outputs contents in correspondence with the data type information, which is appended to in-coming information.

6. A mobile communication terminal according to claim 5, wherein the plurality of application programs further includes an application program for executing a telephone function and an application program for executing a data communication function.

7. A mobile communication terminal according to claim 5, wherein the visual telephone controller comprises an attachment status detecting unit which detects whether the detachable imaging unit is attached to the body when the data type identifying unit has determined that the in-coming information includes image and sound data when a call is received, and the control unit visually or audibly informs a message suggesting attachment of the detachable imaging unit when the attachment status detecting unit has determined that the detachable imaging unit is not attached to the body.

8. A mobile communication terminal according to claim 5, wherein the body has a slot connector, the detachable imaging unit has a card slot section into which the slot connector can be inserted to connect with the card slot section, and the output from the image sensor can be transmitted to the body by inserting the slot connector into the card slot section.

9. A visual telephone system comprising:
   the mobile communication terminal according to claim 5; and
   a base station which sends to the mobile communication terminal data including data type information as a header.

10. A mobile communication terminal according claim 5, further comprising a key which controls the control unit, and wherein, when the key is pressed, the control unit activates an application program in correspondence with the data type information which is appended to in-coming information.

* * * * *